(12) United States Patent
Lee

(10) Patent No.: US 6,962,380 B2
(45) Date of Patent: Nov. 8, 2005

(54) REAR BUMPER ASSEMBLY STRUCTURE FOR VEHICLE

(75) Inventor: Jeong-Ho Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 202 days.

(21) Appl. No.: 10/749,224

(22) Filed: Dec. 30, 2003

(65) Prior Publication Data

US 2005/0093310 A1    May 5, 2005

(30) Foreign Application Priority Data

Oct. 29, 2003 (KR) ...................... 10-2003-0075884

(51) Int. Cl.[7] .............................................. B66R 19/04
(52) U.S. Cl. ..................................... 293/155; 293/126
(58) Field of Search ............................... 293/102, 126, 293/154, 155

(56) References Cited

U.S. PATENT DOCUMENTS

| | | | |
|---|---|---|---|
| 2,275,127 A * | 3/1942 | Brown ........................ 293/155 |
| 3,310,929 A * | 3/1967 | Garvey ........................ 293/155 |
| 4,095,831 A * | 6/1978 | Hagiwara et al. ........... 293/155 |
| 4,483,559 A * | 11/1984 | Lewis et al. ................. 293/155 |
| 4,597,603 A * | 7/1986 | Trabert ........................ 293/117 |
| 4,623,182 A * | 11/1986 | Trabert et al. ............... 293/155 |
| 4,753,560 A * | 6/1988 | Ryder .......................... 293/155 |
| 4,838,593 A * | 6/1989 | Fleming et al. ............. 293/154 |
| 4,875,728 A * | 10/1989 | Copp et al. .................. 293/155 |
| 5,092,643 A * | 3/1992 | Okamoto et al. ........... 293/155 |
| 5,195,793 A * | 3/1993 | Maki ........................... 293/155 |
| 5,202,172 A * | 4/1993 | Graf ............................ 293/128 |
| 5,326,142 A * | 7/1994 | Dodds et al. ................ 293/155 |
| 5,882,054 A * | 3/1999 | Devilliers et al. .......... 293/155 |
| 5,915,767 A * | 6/1999 | Hosoda et al. .............. 293/154 |
| 6,474,708 B1 | 11/2002 | Gehringhoff et al. ....... 293/120 |
| 6,520,553 B2 * | 2/2003 | Muramatsu ................. 293/155 |

* cited by examiner

Primary Examiner—Lori L. Coletta
(74) Attorney, Agent, or Firm—Morgan Lewis & Bockius LLP

(57) ABSTRACT

A rear bumper assembly structure for a vehicle is adapted for the securing of a rear bumper to a rear side part of the vehicle via a mounting bracket integrally formed at the rear bumper. A mounting boss is integrally formed to a rear side outer panel, thereby reducing a vehicle's weight and improving the assembly process and maintenance of the vehicle.

5 Claims, 3 Drawing Sheets

REAR BUMPER ASSEMBLY STRUCTURE FOR VEHICLE

CROSS-REFERENCE TO RELATED APPLICATIONS

This application claims priority of Korean Patent Application No. 10-2003-0075884, filed on Oct. 29, 2003, the disclosure of which is incorporated fully herein by reference.

FIELD OF THE INVENTION

The present invention relates to a structure for fixing a rear bumper of a vehicle body and, more particularly, to a structure for fixing a lateral part of the rear bumper to a rear side outer panel of the vehicle body.

BACKGROUND OF THE INVENTION

Generally, a rear bumper is installed at the rear end of a vehicle for absorbing a rear impact collision. Some rear bumpers have been designed to wrap around the rear end of the vehicle, including the rear side part of the vehicle. Thus, some rear bumpers should have assembly structures for fixing the rear bumper to the rear side part of the vehicle.

SUMMARY OF THE INVENTION

Embodiments of the present invention provide a rear bumper assembly structure for a vehicle that is fixed at the rear side part of the vehicle without the need for additional components, thereby reducing a vehicle's weight, facilitating the assembly process, and improving the maintenance process.

In a preferred embodiment of the present invention, the rear bumper assembly structure for a vehicle comprises a mounting boss having a rectangular column shape and protruding outward from a rear side outer panel. A mounting bracket protrudes inward from a rear bumper toward the mounting boss. A vertical movement-restricting means restricts vertical movement of the mounting bracket and the mounting boss. A horizontal movement-restricting means is formed at the mounting boss for restricting forward movement of the rear bumper. A separation restricting means restricts lateral separation of the mounting bracket and the mounting boss.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
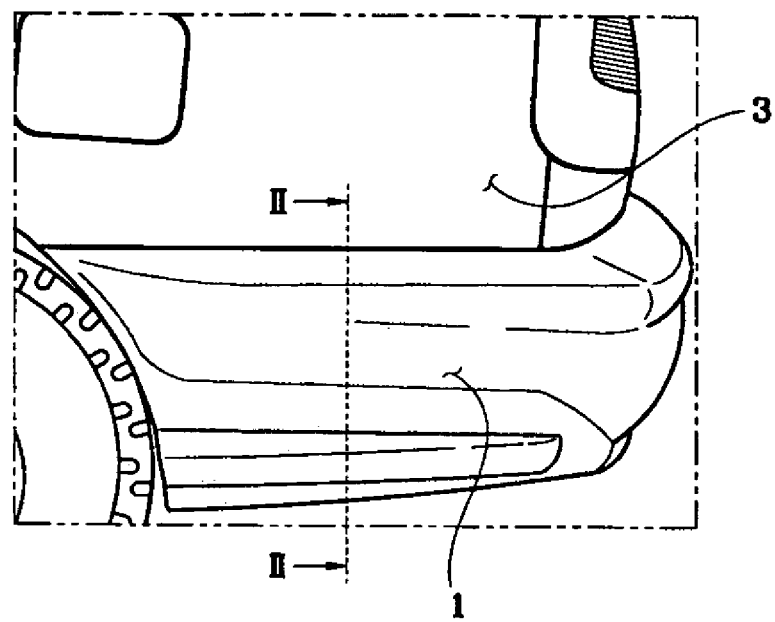
FIG. 1 illustrates a rear side part of a vehicle applied with a rear bumper assembly structure for a vehicle according to an embodiment of the present invention.
Figure 2:
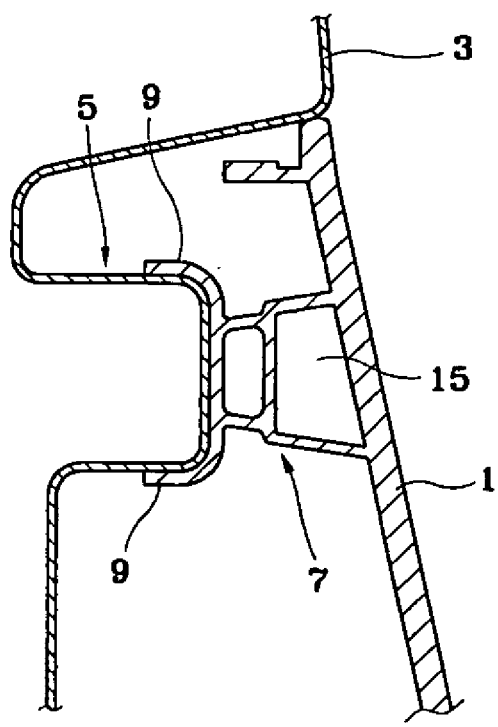
FIG. 2 is a cross-sectional view taken along line II—II of FIG. 1.

As shown in FIG. 1, a rear bumper 1 is installed at the rear end of a vehicle, and the assembled state of the rear bumper 1 to a vehicle body is illustrated in FIGS. 2 to 5.

A rear bumper assembly structure for a vehicle according to an embodiment of the present invention comprises a mounting boss 5 having a rectangular column shape and protruding outward from a rear side outer panel 3. A mounting bracket 7 protrudes inward from the rear bumper 1 toward the mounting boss 5. A vertical movement-restricting means is formed for restricting vertical movement of the mounting bracket 7 and the mounting boss 5. A horizontal movement-restricting means is formed at the mounting boss 5 for restricting the rear bumper 1 from moving toward the front of the vehicle. A separation restricting means is formed for restricting lateral separation of the mounting bracket 7 and the mounting boss 5.

The rear bumper assembly structure for a vehicle according to an embodiment of the present invention is configured such that the rear bumper 1 can be fixed to the rear side part of the vehicle via the mounting boss 5 and the mounting bracket 7, wherein the mounting boss 5 is integrally formed at the rear side outer panel 3 and the mounting bracket 7 is integrally formed at the rear bumper 1.

The vertical movement-restricting means constitutes two vertical movement-restricting plates 9 protruding outward from the mounting bracket 7 for externally covering two horizontal sides of the mounting boss 5 facing each other.

Figure 3:
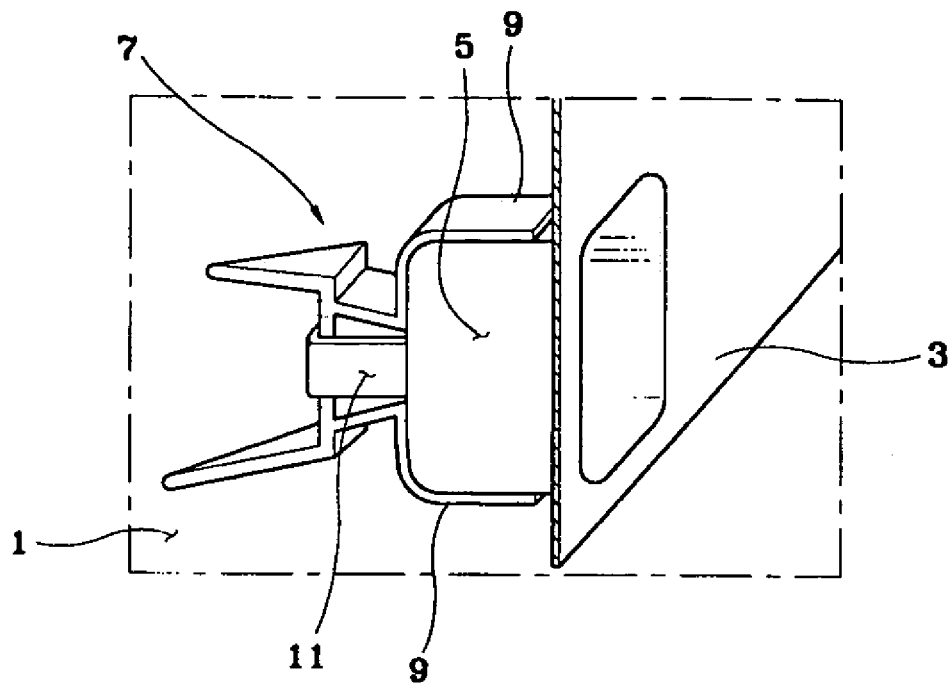
FIG. 3 illustrates an assembly state of a mounting bracket and a mounting boss when observed from the front of the vehicle.
Figure 4:
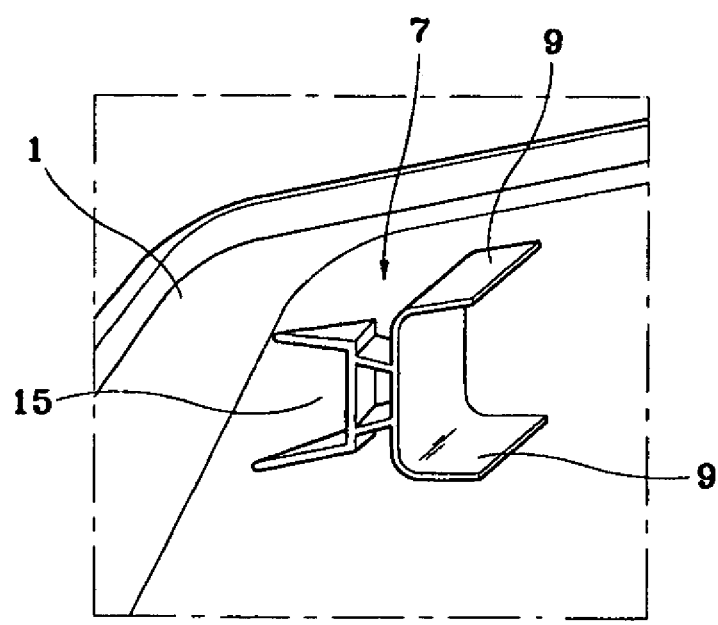
FIG. 4 is a perspective view of a mounting bracket equipped inside a rear bumper when observed from the front of the vehicle.

With reference to FIG. 3, the two vertical movement-restricting plates 9 externally enclose the upper and lower sides of the mounting boss 5, thereby restricting vertical movement of the rear bumper 1 in relation to the rear side outer panel 3.

The horizontal movement-restricting means constitutes a horizontal movement-restricting plate 11 that protrudes perpendicularly outward from the mounting boss 5 in relation to the vertical restricting plates 9 the support a lateral side of the mounting bracket 7.

Figure 5:
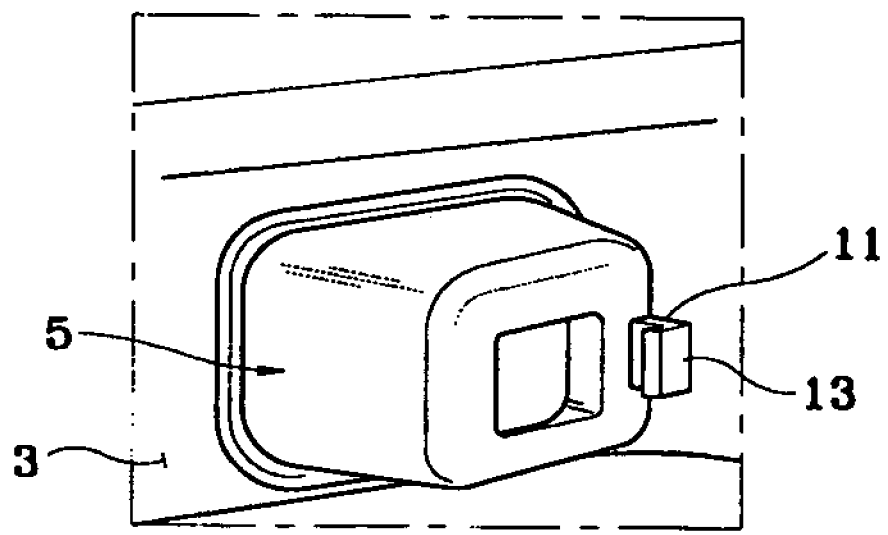
FIG. 5 is a perspective view of a mounting boss of a rear side outer panel when observed from the back of the vehicle.

As shown in FIG. 5, the horizontal movement-restricting plate 11 that protrudes outwardly from the mounting boss 5 blocks the mounting bracket 7 (see FIG. 3), thus restricting forward movement of the rear bumper 1 when the rear bumper 1 is completely assembled to the vehicle body.

The separation restricting means is constituted by a locking protruder 13 and a locking hole 15, wherein the locking protruder 13 protrudes from a distal end of the horizontal movement-restricting plate 11 toward the mounting bracket 7, and the locking hole 15 is formed for allowing the locking protruder 13 to be inserted into the mounting bracket 7.

As shown in FIG. 3, once the locking protruder 13 of the mounting bracket 7 is inserted into the locking hole 15, the locking protruder 13 restricts the mounting bracket 7 from moving from the mounting boss 5 in a lateral direction of the vehicle.

The assembly process of the rear side outer panel 3 and rear bumper 1 thus constructed will now be described.

When the rear bumper 1 is inserted into the rear end of the vehicle, the mounting boss 5 is inserted between the two vertical movement-restricting plates 9, and the rear bumper 1 is inserted toward the frontal direction of the vehicle. However, once the mounting bracket 7 contacts the horizontal movement-restricting plate 11, the rear bumper 1 becomes restricted in movement.

Once the rear bumper 1 is restricted in movement via the horizontal movement-restricting plate 11 integrally formed with a locking protruder 13, the locking protruder 13 will be inserted into the locking hole 15.

The rear bumper 1 constructed above is restricted in vertical, horizontal and lateral movement in relation to the rear side outer panel 3, and is movable only in the rear direction of the vehicle.

Provided that the rear bumper 1 is secured to the rear end of the vehicle by a bolt or the like, the rear bumper 1 will be completely fastened to the vehicle body. The rear bumper 1 is restricted in all directions with respect to the rear side outer panel 3, and thus, the rear part of the vehicle body is formed according to the original design.

On the other hand, while a vehicle is being repaired, the rear bumper 1 can be separated from the vehicle body by unscrewing the fastener such as a bolt or the like, which is fixed to the rear bumper 1 to the rear end of the vehicle, thereby providing convenience during the maintenance of a vehicle.

As apparent from the foregoing, there is an advantage in the rear bumper assembly structure for a vehicle according to an embodiment of the present invention in that the structure is adapted to fix a rear bumper at the rear side part of the vehicle without additional components, thereby reducing the vehicle's weight, facilitating the assembly, and improving the maintenance process.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A rear bumper assembly structure for a vehicle, comprising:
   a mounting boss having a shape of a rectangular column and protruding outward from a rear side outer panel;
   a mounting bracket protruding inward from a rear bumper toward said mounting boss;
   a vertical movement-restricting means restricting vertical movement of said mounting bracket in relation to said mounting boss;
   a horizontal movement-restricting means formed at said mounting boss for restricting forward movement of said rear bumper; and
   a separation restricting means restricting lateral separation of said mounting bracket and said mounting boss.

2. The structure as defined in claim 1, wherein said vertical movement-restricting means further comprises two vertical movement-restricting plates protruding from said mounting bracket for externally enclosing two horizontal sides of said mounting boss facing each other.

3. The structure as defined in claim 2, wherein said horizontal movement-restricting means further comprises a horizontal movement-restricting plate perpendicularly protruding from said mounting boss in relation to said vertical movement-restricting plates for supporting a lateral side of said mounting bracket.

4. The structure as defined in claim 3, wherein said separation restricting means comprises:
   a locking protruder protruding out from a distal end of said horizontal movement-restricting plate toward said mounting bracket; and
   a locking hole formed for allowing said locking protruder to be inserted into said mounting bracket.

5. The structure as defined in claim 1, wherein said mounting boss is integrally formed at said rear side outer panel, and said mounting bracket is integrally formed at said rear bumper.

* * * * *